Figure 1:
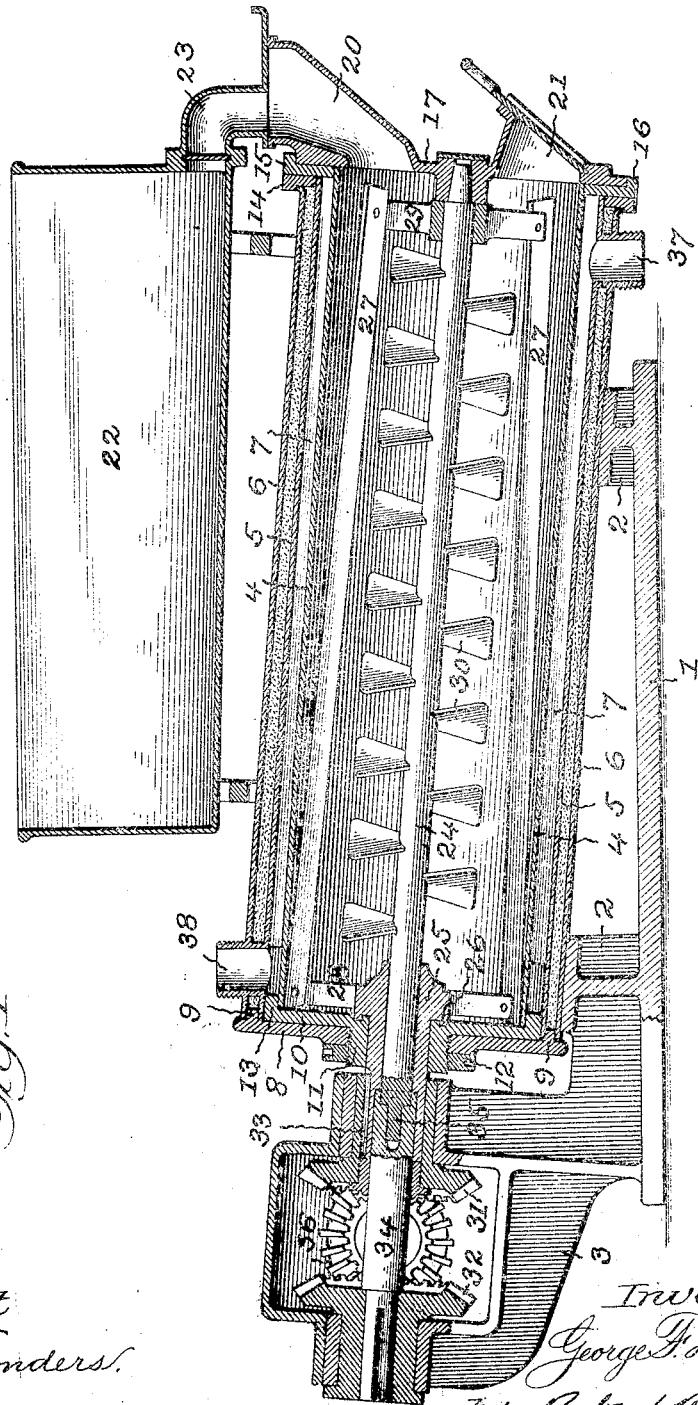

G. F. DICKSON.
FREEZER.
APPLICATION FILED MAR. 14, 1908.

941,767.

Patented Nov. 30, 1909.
3 SHEETS—SHEET 1.

Attest
John Enders.
Harry Moe.

Inventor:
George F. Dickson,
by Robert Burns
Attorney.

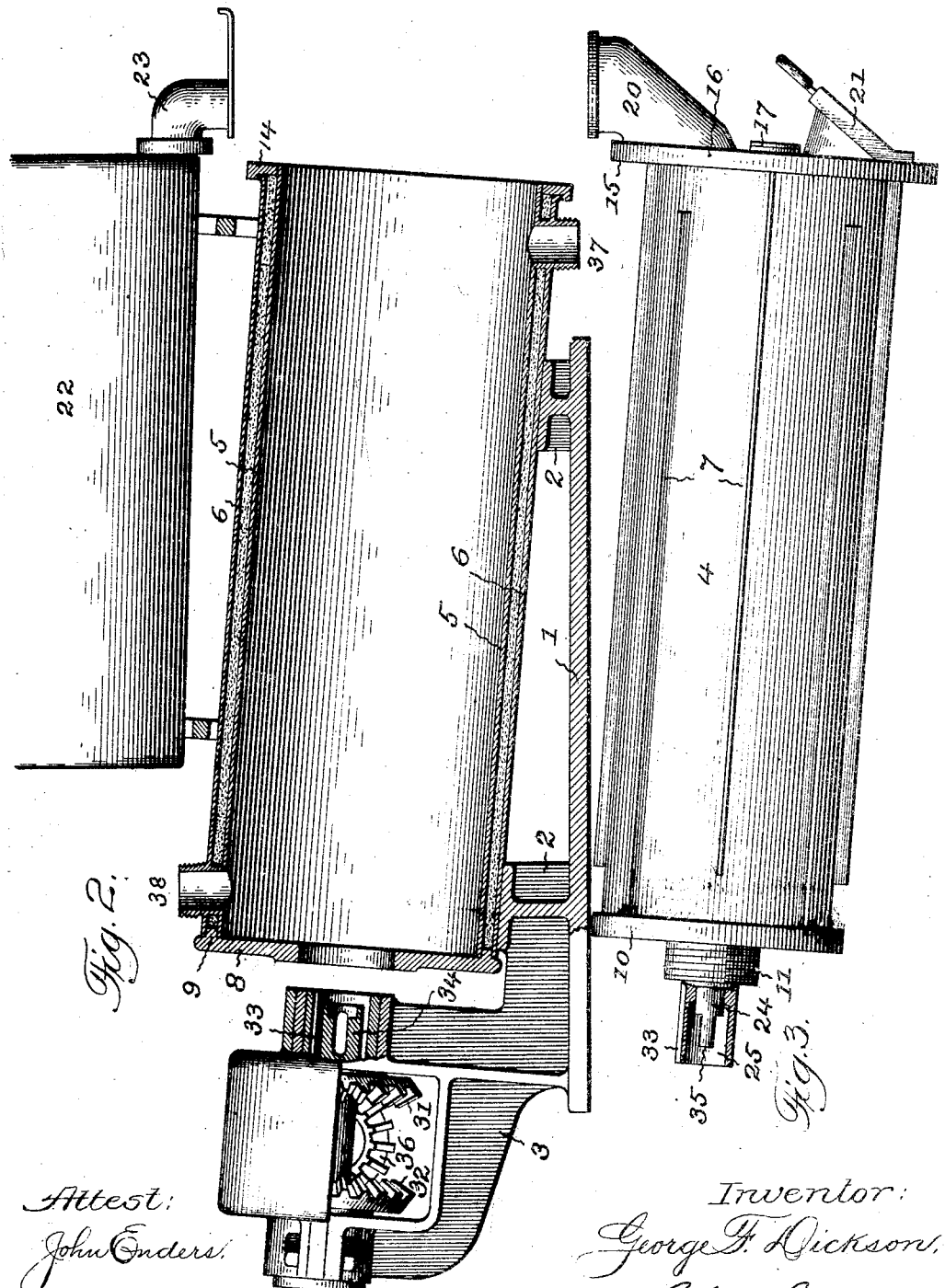

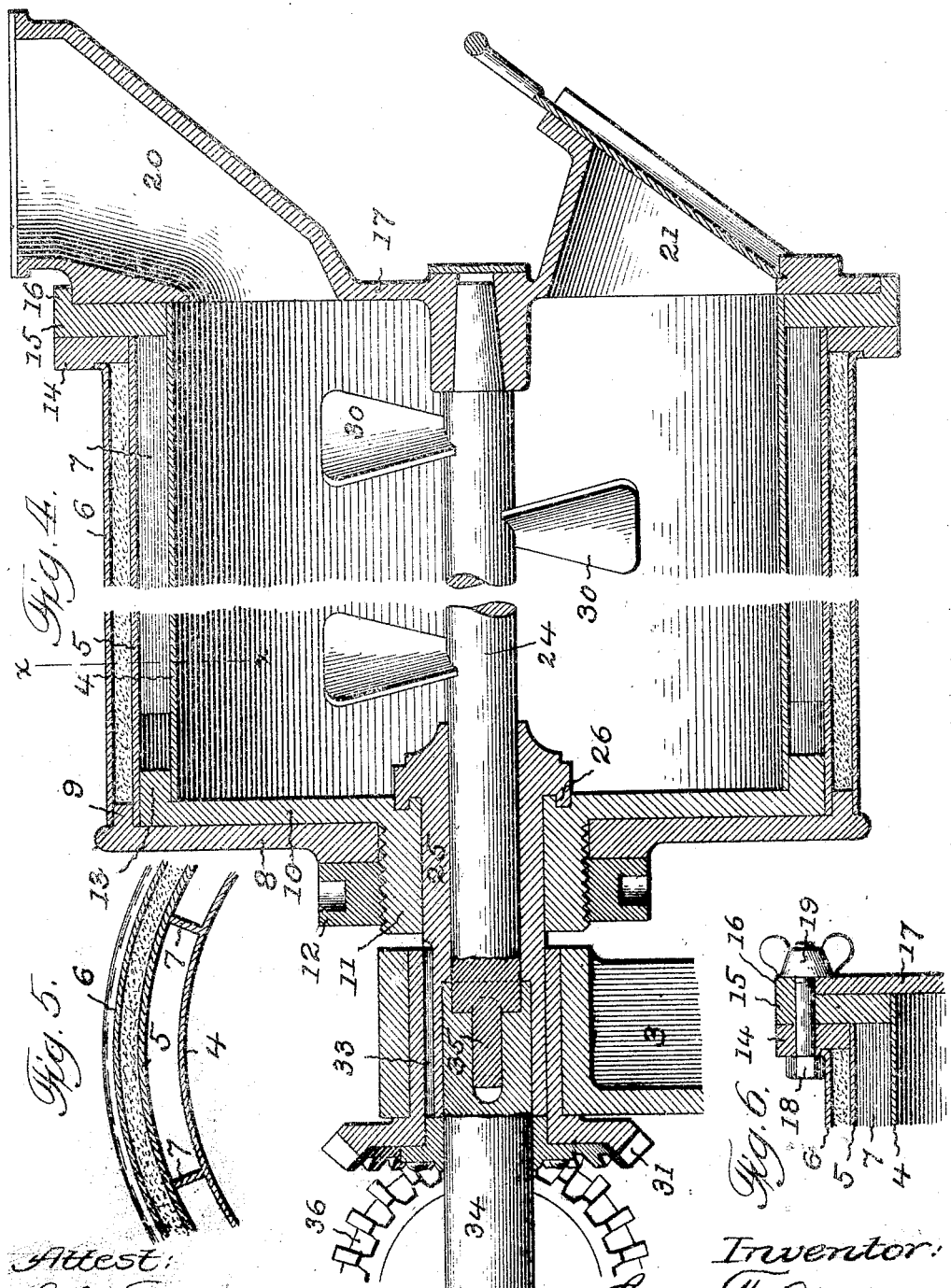

UNITED STATES PATENT OFFICE.

GEORGE F. DICKSON, OF CHICAGO, ILLINOIS, ASSIGNOR TO CONFECTIONERS AND BAKERS SUPPLY CO., OF CHICAGO, ILLINOIS, A CORPORATION OF ILLINOIS.

FREEZER.

941,767.     Specification of Letters Patent.     Patented Nov. 30, 1909.

Application filed March 14, 1908. Serial No. 421,205.

*To all whom it may concern:*

Be it known that I, GEORGE F. DICKSON, a citizen of the United States of America, and a resident of Chicago, in the county of Cook and State of Illinois, have invented certain new and useful Improvements in Freezers, of which the following is a specification.

This invention relates to that type of freezers in which the freezing chamber is surrounded by an annular refrigerating brine chamber, and is provided with revolving scrapers and conveyers by which the material undergoing treatment is kept constantly moving during the progress of the operation, an example of which is described in detail in my prior application for patent, Serial No. 387,046, filed August 5, 1907. And the present improvement has for its object to provide a simple and efficient structural arrangement and combination of parts whereby the same can be detached from each other in a ready and convenient manner for cleaning purposes, and more particularly for the removal of the slime and sediment which accumulate very rapidly in the serpentine passages of the annular brine chamber of the apparatus, all as will hereinafter more fully appear.

In the accompanying drawings illustrative of the present invention:—Figure 1, is a central longitudinal section. Fig. 2, is a sectional elevation, with the freezing chamber and its accessories removed. Fig. 3, is a side elevation, with parts in section, of the freezing chamber and its accessories. Fig. 4, is an enlarged detail central longitudinal section. Fig. 5, is an enlarged detail transverse section on line $x$—$x$, Fig. 4. Fig. 6, is an enlarged detail horizontal section.

Similar numerals of reference indicate like parts in the several views.

Referring to the drawings, 1 represents the bed plate of the apparatus having a pair of saddle pieces 2 of different heights for the support of the freezing chamber and its accessories in an inclined position as shown.

3 is a forked pedestal on the base 1 for the support of the driving mechanism of the scrapers and conveyers of the freezing chamber.

4, 5 and 6 are annular shells held in spaced relation by the heads hereinafter described, to provide an outer annular insulating chamber adapted to contain a filling of non-conducting material; an intermediate annular brine chamber divided into a serpentine passage by the series of radial partitions 7, generally employed where a circulation of a cooling medium is used to lower the temperature of a substance undergoing treatment, and an inner chamber in which the cream or other material is agitated and frozen.

8 is a head or spider provided with a central orifice for the passage of the secondary head hereinafter described, and with an annular flange 9 near its margin, and which fits between the rear ends of the shells 5 and 6, to form an end closure for the rear end of the annular insulating chamber above referred to; the connection between the parts being made permanent by solder or other usual means.

10 is the secondary head above referred to, and which is provided at its center with a tubular hub or neck 11 which passes through the central orifice of the head 8 and is externally screw-threaded for the reception of a holding nut or collar 12 by which the heads are held in proper relation when the parts are assembled. At its periphery said head 10 is provided with an annular flange 13 inside of which the rear end of the inner shell 4 is secured by solder or other usual means, and such flange has an external diameter approximating the internal diameter of the shell 5 so as to be capable of longitudinal movement in said shell during the assemblage and disassemblage of the parts of the apparatus hereinafter more fully described.

14 is a ring or annulus secured to the forward ends of the shells 5 and 6 to form an end closure for the annular insulating chamber above referred to.

15 is a secondary ring or annulus, inside of which the forward end of the inner shell 4 is secured by solder or other means. Such ring 15 is adapted to fit against the ring 14 to form a closure for the forward end of the brine chamber above referred to, and is provided with a marginal flange 16 forming a recess for the reception of the closure head of the freezing chamber.

17 is the closure head for the freezing chamber above referred to, and which is held in place in a removable manner by bolts 18 extending through the rings 14 and 15 and through the margin of the closure head and provided with clamping nuts 19, as shown in Fig. 6.

20 is an inlet neck or hopper, and 21 a gated outlet neck formed on the removable head 17, and providing a convenient means for filling and emptying the freezing chamber.

22 is an open top tank for initially receiving the supply of cream to be frozen; such tank is supported by suitable brackets above the main apparatus above described, and is provided with a faucet 23 at its forward end and adapted to discharge into the inlet neck 20 aforesaid.

24 is an inner axially arranged shaft arranged longitudinally in the freezing chamber, with its forward end journaled in a bearing recess formed therefor in the removable head 17; while at its rear end said shaft extends to the rear of the freezing chamber and is provided with a non-circular end for detachable engagement with the driving gear as hereinafter more fully set forth.

25 is a tubular shaft having bearing in the bore of the hub or neck 11 of the secondary head 10, before described, and forming in turn a bearing for the aforesaid inner shaft 24. Such tubular shaft also extends to the rear of the freezing chamber and is provided with a key way or like non-circular portion for operative engagement with the driving gear hereinafter described.

26 is a circular rim carried by the shaft 25 and adapted to fit a corresponding recess in the inner face of the head 10, to constitute a sealing gland against leakage along the periphery of said shaft.

27 are a pair of scraper and conveyer blades moving in contact with the circular inner wall of the freezing chamber, and extending the length of the same in a plane oblique to the longitudinal axis of the apparatus. Such blades are attached at their rear ends to arms 28 on the shaft 25 aforesaid, and at their forward ends to similar arms of a spider 29 the hub of which has journaled bearing on the forward end of the shaft 24 aforesaid.

30 are a series of inclined conveyer blades carried by the axial shaft 24, and extending radially into adjacent relation to the blades 27 aforesaid.

31 and 32 are bevel gears journaled by means of their hubs in the forks of the pedestal 3 on the main base, in separated relation and upon an axis common with that of the freezing chamber and the shafts 24 and 25 aforesaid. The bevel gear 31 is adapted to have detachable operative engagement with the rear end of the tubular shaft 25 by a key and keyway 33, or other usual non-circular formation of parts; while the bevel gear 32 carries a section of shafting 34, the forward end of which is formed with a non-circular recess for operative engagement with a correspondingly formed non-circular extension 35 on the rear end of the shaft 24 aforesaid.

36 is an intermediate bevel gear meshing with and driving the aforesaid bevel gear 31 and 32 in opposite directions; such bevel gear 36 is carried by a shaft which in turn is connected in any usual manner with a power source.

37 is the brine inlet neck arranged near the lowermost part of the brine chamber, and 38 is the brine outlet neck arranged at the highermost part of said brine chamber.

The main feature of novelty in the present improvement consists in the fixed attachment of the radial partitions 7 of the brine chamber to the inner shell 4 so as to be removable therewith in the operation of dismembering the apparatus for the periodical cleaning of the brine chamber. It has been found from extended practical experience that such brine chamber rapidly clogs up with slime and other impurities in a short time, to cause a rapid decrease in the efficiency of the apparatus when allowed to accumulate.

With a view to provide for a ready and effective cleaning of the brine chamber, the above described arrangement of the radial partitions 7 is made, and which in connection with the detail construction of the apparatus heretofore described admits of a ready dismemberment of the apparatus by the simple operation of unscrewing holding nut or collar 12, when the inner shell 4, carrying the head 10, annulus 15 and closure head 17, as well as the operating shafts 24 and 25, can as a whole be drawn longitudinally out of the shell 5, and then away from the other fixed parts of the apparatus as illustrated in Figs. 2 and 3, and in which condition the partitions 7 forming the serpentine brine passage of the apparatus are fully exposed and accessible for the required cleaning operation. The detachable connection of the shafts 24 and 25 to their bevel gears 31 and 32 above described permits of the ready performance of the disconnection of parts above described.

The general operation of the apparatus in the manufacture of ice-cream or the like will be the same as that described in my aforesaid application Serial No. 387,046, or other apparatus of the same type and now used extensively in the manufacture of ice-cream.

Having thus full described my said invention, what I claim as new and desire to secure by Letters Patent, is:—

1. The combination in a freezer, of an inner closed casing constituting a freezing chamber and carrying a series of partitions on its outer surface, an outer casing fitting over said inner casing and its partitions to form a brine chamber and provided with a head at one end, and means for detachably connecting said casings together, the same comprising a central neck on the inner casing head projecting through a central end orifice in the outer casing, and a fastening means engaging said central neck, in a manner which permits of ready longitudinal separation of the casings in cleaning out the brine chamber, substantially as set forth.

2. The combination in a freezer, of an inner closed casing constituting a freezing chamber and carrying a series of partitions on its outer surface, an outer casing fitting over said inner casing and its partitions to form a brine chamber and provided with a head at one end, and means for detachably connecting said casings together in a manner which permits of ready longitudinal separation of the casings in cleaning out the brine chamber, the same comprising a central neck on the inner casing head projecting through a central orifice in the outer casing head and screw threaded, and a holding nut engaging said screw threaded neck, substantially as set forth.

3. The combination in a freezer, of an inner closed cylindrical casing constituting a freezing chamber and carrying a series of radial partitions on its periphery, an outer casing fitting over said inner casing and partitions to form a brine chamber and provided with a head at one end, and means for detachably connecting said casings together in a manner which permits of ready longitudinal separation of the casings in cleaning out the brine chamber, the same comprising a central neck on the inner casing head projecting through a central orifice in the outer casing head and screw-threaded, and a holding nut engaging said screw-threaded neck, substantially as set forth.

4. The combination in a freezer, of an inner casing constituting a freezing chamber and having a fixed head at one end and a removable head at the other end and a series of partitions on its outer surface, an outer casing fitting over said inner casing and partitions to form a brine chamber and provided with an end head having a central neck, and means engaging said neck for detachably connecting said casings together in a manner which permits of ready longitudinal separation of the casings in cleaning out the brine chamber, substantially as set forth.

5. The combination in a freezer, of an inner casing constituting a freezing chamber and having a fixed head at one end and a removable head at the other end and a series of partitions on its outer surface, an outer casing fitting over said inner casing and partitions to form a brine chamber and provided with a head, and means for detachably connecting said casings together in a manner which permits of ready longitudinal separation of the casings in cleaning out the brine chamber, the same comprising a central neck on the inner casing head projecting through a central orifice in the outer casing head and screw-threaded for the reception of a holding nut, substantially as set forth.

Signed at Chicago, Illinois, this 10th day of March, 1909.

GEORGE F. DICKSON.

Witnesses:
ROBERT BURNS,
HENRY MOE.